(12) United States Patent
Watanabe (10) Patent No.: US 6,637,838 B2
(45) Date of Patent: Oct. 28, 2003

(54) PNEUMATIC BOOSTER

(75) Inventor: Shuzo Watanabe, Yamanashi (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 10/132,417

(22) Filed: Apr. 26, 2002

(65) Prior Publication Data

US 2002/0158508 A1 Oct. 31, 2002

(30) Foreign Application Priority Data

Apr. 27, 2001 (JP) ..................................... 2001-133013

(51) Int. Cl.⁷ ................................................. B60T 8/44
(52) U.S. Cl. .................................................. 303/114.3
(58) Field of Search ............................ 91/369.1, 369.2, 91/369.3, 369.4, 376 R; 303/114.3

(56) References Cited

U.S. PATENT DOCUMENTS 5,233,911 A  8/1993  Rossigno

FOREIGN PATENT DOCUMENTS

DE  198 32 357  1/2000

*Primary Examiner*—Christophaer P. Schwartz
(74) *Attorney, Agent, or Firm*—Wenderoth, Lind & Ponack, L.L.P.

(57) ABSTRACT

A tandem pneumatic booster includes a front shell having a relatively long cylindrical portion and a rear shell having a relatively short cylindrical portion. The cylindrical portions of the front and rear shells are joined together to form a shell body. An opening edge of a cylindrical portion of a center shell is disposed in the joint between the front and rear shells, together with an outer peripheral bead of a diaphragm of a rear power piston. The cylindrical portion of each of the front, rear and center shells has a frusto-conical shape gradually increasing in diameter toward the opening edge thereof. Thus, when front shells, rear shells and center shells are stacked on one another, respectively, as constituent parts before assembly, the depth of fitting between each pair of adjacent shell elements is increased sufficiently to stably maintain the stacked conditions of the shell elements.

8 Claims, 7 Drawing Sheets

PNEUMATIC BOOSTER

BACKGROUND OF THE INVENTION

The present invention relates to a pneumatic booster for use in a brake system of a vehicle.

Figure 6:
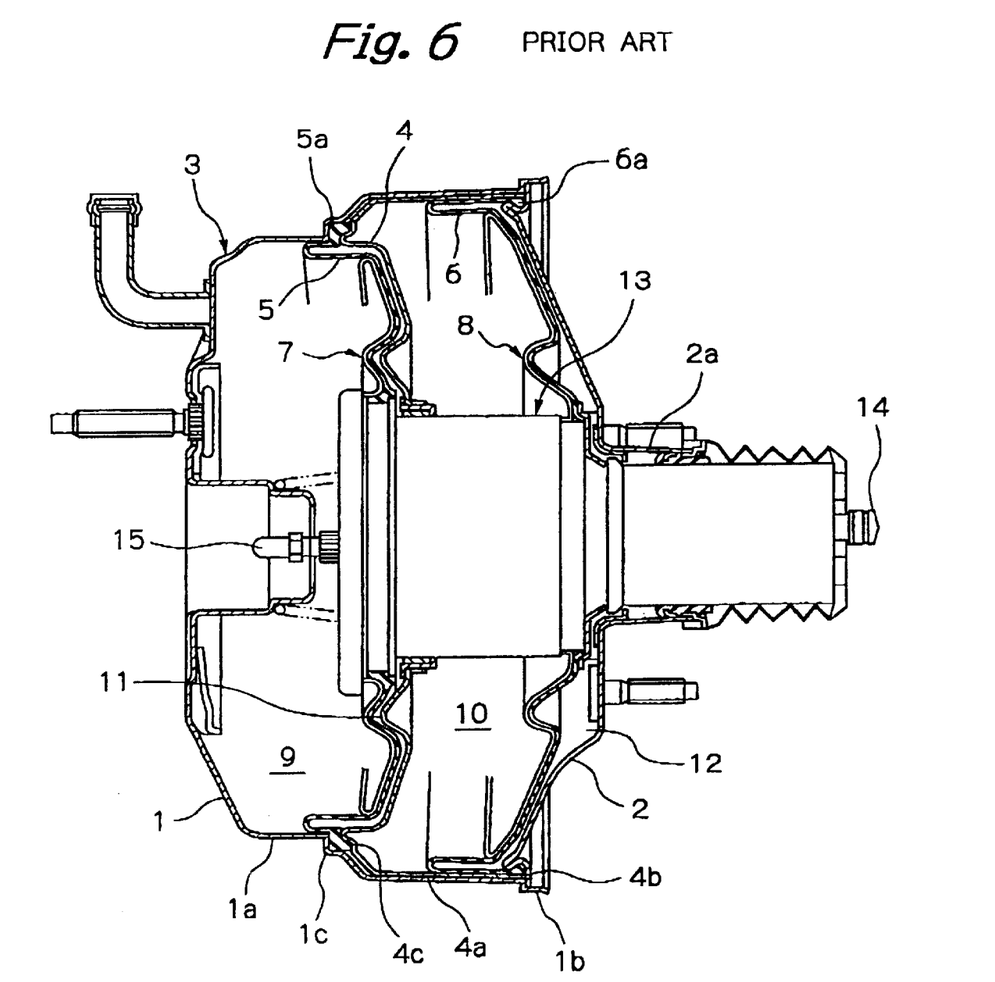
FIG. 6 is a sectional view showing the general structure of a conventional tandem pneumatic booster.

A tandem pneumatic booster, for example, has a structure as shown in FIG. 6. The pneumatic booster has a shell body 3 comprising a front shell 1 and a rear shell 2. The interior of the shell body 3 is divided by a center shell 4 into two chambers, i.e., a front chamber and a rear chamber. The two chambers divided by the center shell 4 are further divided. That is, the front chamber is divided by a power piston 7 having a diaphragm 5 into a constant-pressure chamber 9, in which a negative pressure is to be introduced, and a variable-pressure chamber 11, in which atmospheric air is to be introduced. Similarly, the rear chamber is divided by a power piston 8 having a diaphragm 6 into a constant-pressure chamber 10, in which a negative pressure is to be introduced, and a variable-pressure chamber 12, in which atmospheric air is to be introduced. The power pistons 7 and 8 are provided with a mutual valve body 13. The valve body 13 extends air-tightly and slidably through a central portion of the center shell 4 and through a reduced-diameter cylindrical portion 2a projecting from the rear of the rear shell 2. The valve body 13 contains a valve mechanism (not shown). The valve mechanism is operated through an input rod 14 movable in response to the actuation of a brake pedal to produce differential pressures between the constant-pressure chambers 9 and 10 on the one hand and the variable-pressure chambers 11 and 12 on the other. The differential pressures propel the front and rear power pistons 7 and 8. Thus, a boosted thrust is transmitted to a master cylinder (not shown) through an output rod 15.

In this type of pneumatic booster, the front shell 1 has a cylindrical portion 1a extending rearward to a considerable extent. The outer peripheral edge of the rear shell 2 is joined to an opening edge 1b of a cylindrical portion 1a of the front shell 1, and these edges are united together, for example, by caulking to form the shell body 3. In the above-described tandem pneumatic booster, the center shell 4 also has a cylindrical portion 4a extending rearward to a relatively large extent. The opening edge 4b of the cylindrical portion 4a of the center shell 4 is disposed in the joint between the front shell 1 and the rear shell 2. Of the two diaphragms 5 and 6 constituting the power pistons 7 and 8, the rear diaphragm 6 has an outer peripheral bead 6a thereof also disposed in the joint between the front and rear shells 1 and 2. It should be noted that the front diaphragm 5 is supported by the shell body 3 in a state where an outer peripheral bead 5a of the diaphragm 5 is disposed between a step portion 1c provided on an intermediate part of the cylindrical portion 1a of the front shell 1 and a shoulder portion 4c at the proximal end of the cylindrical portion 4a of the center shell 4.

In this type of pneumatic booster, the front shell 1 has a cylindrical portion 1a extending rearward to a considerable extent. The outer peripheral edge of the rear shell 2 is joined to the opening edge 1b of the cylindrical portion 1a of the front shell 1, and these edges are united together, for example, by caulking to form the shell body 3. In the above-described tandem pneumatic booster, the center shell 4 also has a cylindrical portion 4a extending rearward to a relatively large extent. The opening edge 4b of the cylindrical portion 4a of the center shell 4 is disposed in the joint between the front shell 1 and the rear shell 2. Of the two diaphragms 5 and 6 constituting the power pistons 7 and 8, the rear diaphragm 6 has an outer peripheral bead 6a thereof also disposed in the joint between the front and rear shells 1 and 2. It should be noted that the front diaphragm 5 is supported by the shell body 3 in a state where an outer peripheral bead 5a of the diaphragm 5 is disposed between a step portion 1c provided on an intermediate part of the cylindrical portion 1a of the front shell 1 and a shoulder portion 4c at the proximal end of the cylindrical portion 4a of the center shell 4.

Figure 7A:
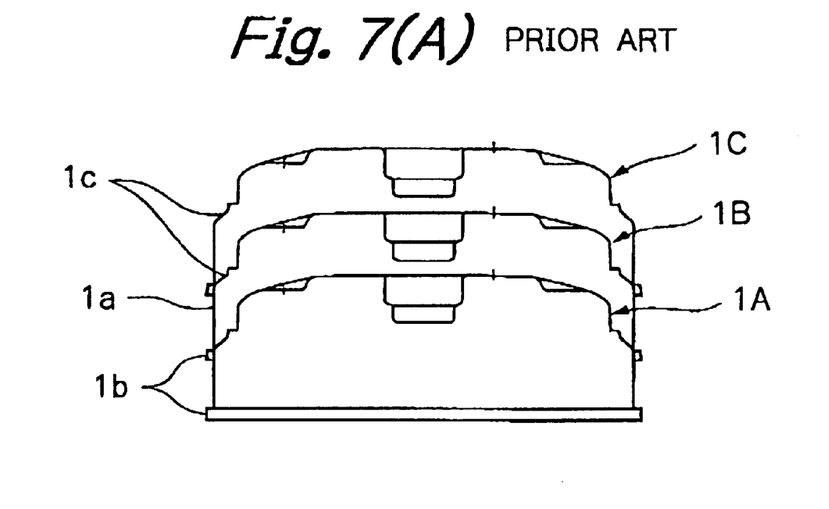
FIGS. 7(A), 7(B) and 7(C) are sectional views showing the stacked conditions of shell elements constituting the conventional tandem pneumatic booster.
Figure 7B:
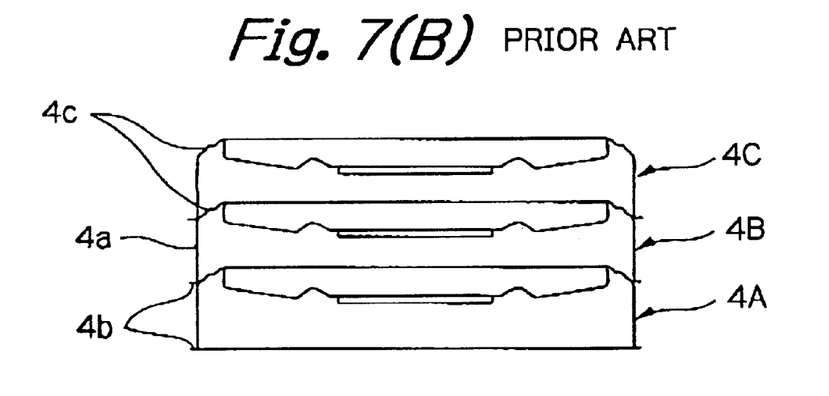
Figure 7C:
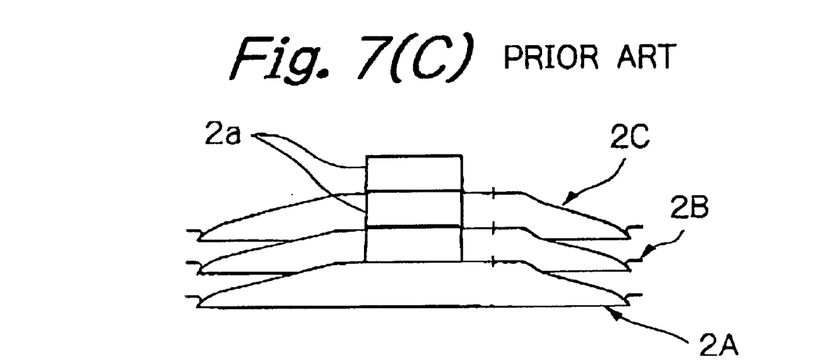

The above-described conventional pneumatic booster suffers, however, from the following problems. The cylindrical portion 1a of the front shell 1 and the cylindrical portion 4a of the center shell 4 are each formed in a circular straight cylindrical shape. Therefore, when front shells 1 (1A, 1B and 1C) as constituent parts before assembly are stacked on one another in such a manner that the cylindrical portions 1a of the front shells 1 are mounted on each other, as shown in FIG. 7(A), the stacked condition of the front shells 1 is such that the opening edge 1b of each front shell 1 is only slightly engaged with the edge of the shoulder portion (step portion) 1c of the underlying front shell 1. Similarly, the stack of center shells 4 (4A, 4B and 4C) is, as shown in FIG. 7(B), such that the opening edge 4b of each center shell 4 is only slightly engaged with the edge of the shoulder portion (step portion) 4c of the underlying center shell 4. Regarding the stack of rear shells 2 (2A, 2B and 2C), as shown in FIG. 7(C), no overlap is present except that the reduced-diameter cylindrical portions 2a thereof butt to each other. Thus, all the stacks of front shells 1, rear shells 2 and center shells 4 (these will hereinafter be referred to as "shell elements") lack in balance, so that the stacked condition of shell elements is difficult to maintain stably Accordingly, handling of the stacked shell elements during storage, transport, etc. is extremely troublesome. Further, a large space is formed between each pair of adjacent shell elements when stacked as stated above, resulting in an increase In volume. Consequently, the storage efficiency and the transport efficiency degrade markedly, causing a large economic loss.

SUMMARY OF THE INVENTION

The present invention was made in view of the above-described problems with the prior art.

An object of the present invention is to provide a pneumatic booster designed so that when shell elements as constituent parts before assembly are stacked on one another, an overlap of a predetermined size can be ensured between each pair of adjacent shell elements, thereby making a great contribution to the improvement in handleability and to the improvement in storage efficiency and transport efficiency.

The present invention is applied to a pneumatic booster including a front shell element having a bottom portion and a cylindrical portion (outer cylindrical portion) extending from the edge of the bottom portion. The front shell element further has an inner cylindrical portion projecting in the same direction as the direction of extension of the outer cylindrical portion to receive a master cylinder. The pneumatic booster further includes a rear shell element having a bottom portion and a cylindrical portion (outer cylindrical portion) extending from the edge of the bottom portion. A shell body is formed by uniting together the front shell element and the rear shell element in such a manner that the opening edges of the outer cylindrical portions of the front and rear shell elements on the sides thereof opposite to their respective bottom portions are joined together. A valve body is provided to extend through the rear shell element. The valve body has a valve mechanism therein. A power piston is engaged with the valve body to divide the interior of the shell body into a constant-pressure chamber and a variable-pressure chamber. According to the present Invention, the outer cylindrical portion of the front shell element has at least one reduced-diameter portion smaller in diameter than the opening edge, and the inner cylindrical portion of the front shell element has at least one reduced-diameter portion smaller in diameter than the proximal end edge of the inner cylindrical portion at the bottom portion, so that when a plurality of front shell elements as constituent parts before assembly are stacked on one another, both the outer cylindrical portions and the inner cylindrical portions of adjacent front shell elements are fitted in each other, respectively.

With the above-described structure, when a plurality of front shell elements as constituent parts before assembly are stacked on one another, the outer cylindrical portions of each pair of adjacent front shell elements are fitted in each other with a sufficient overlap therebetween. The inner cylindrical portions of each pair of adjacent front shell elements are also fitted in each other with a sufficient overlap therebetween. Therefore, the stacked condition can be maintained stably. Hence, it is possible to facilitate handling of the stacked front shell elements during storage, transport, etc. Moreover, it is possible to reduce the volume of front shell elements as stacked on one another.

Further, the pneumatic booster according to the present Invention may be arranged as follows. The rear shell element has a bottom portion and an outer cylindrical portion extending from the outer edge of the bottom portion and further has an inner cylindrical portion projecting from the bottom portion in a direction opposite to the direction of extension of the outer cylindrical portion. The outer cylindrical portion of the rear shell element has a reduced-diameter portion smaller in diameter than the opening edge thereof, and the inner cylindrical portion of the rear shell element has at least one reduced-diameter portion smaller in diameter than the proximal end edge of the inner cylindrical portion at the bottom portion, so that when a plurality of rear shell elements as constituent parts before assembly are stacked on one another, both the outer cylindrical portions and the inner cylindrical portions of adjacent rear shell elements are fitted in each other, respectively.

It is desirable in the pneumatic booster according to the present invention that the shell element whose cylindrical portion has a frusto-conical shape as stated above should be provided with a stopper portion for regulating the depth of fitting between the cylindrical portions of each pair of adjacent shell elements as stacked on one another when they are constituent parts before assembly. In this case, the cylindrical portions of the stacked shell elements can be prevented from sticking fast to each other by the stopper portion. Therefore, there is no likelihood that the stacked shell elements will become difficult to separate from each other owing to the wedge effect.

The above and other objects, features and advantages of the present invention will become more apparent from the following description of the preferred embodiments thereof, taken in conjunction with the accompanying drawings.

DETAILED DESCRIPTION OF THE INVENTION

Embodiments of the present invention will be described below with reference to the accompanying drawings.

Figure 1:
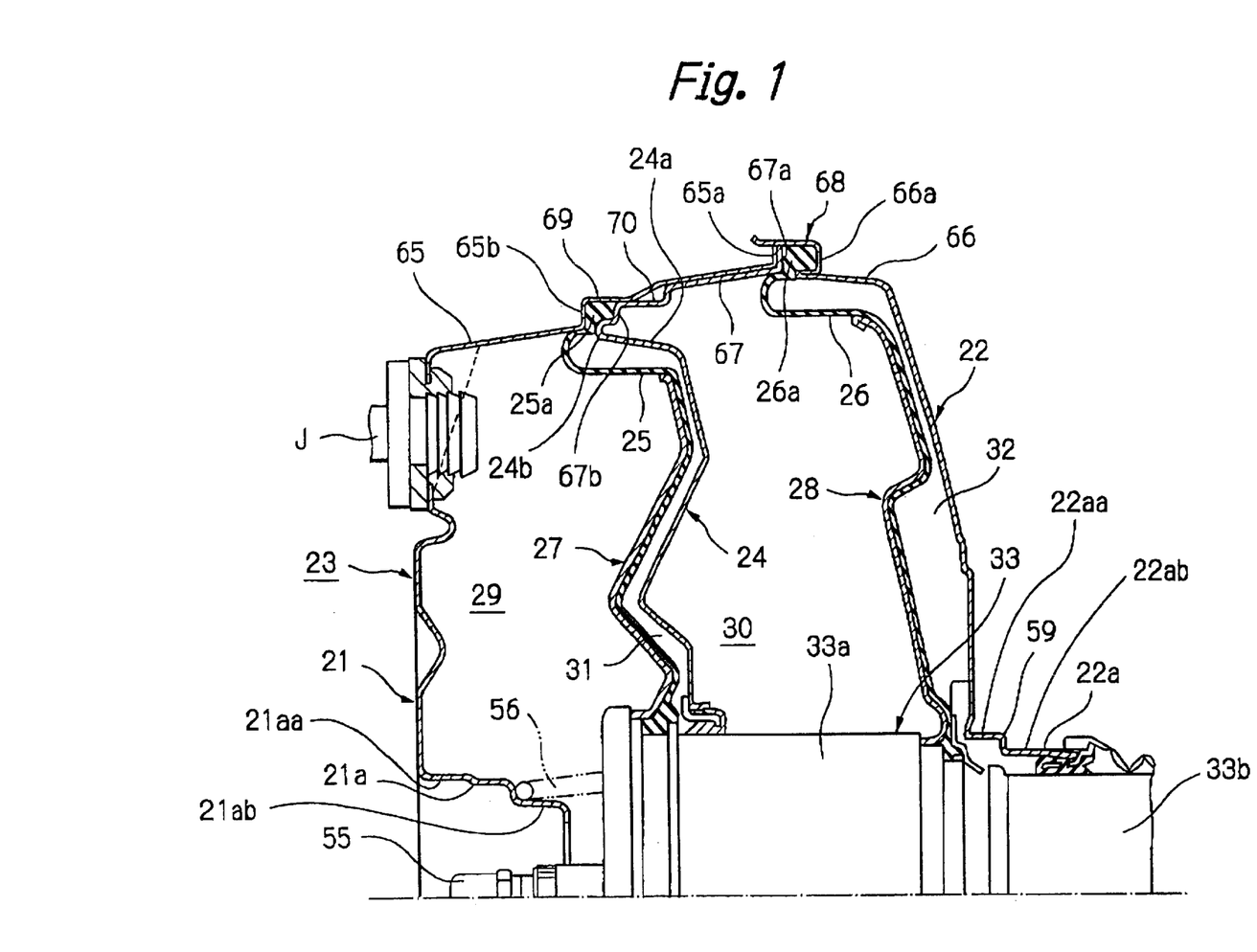
FIG. 1 is a sectional view showing the structure of an essential part of a tandem pneumatic booster according to the present invention.
Figure 2:
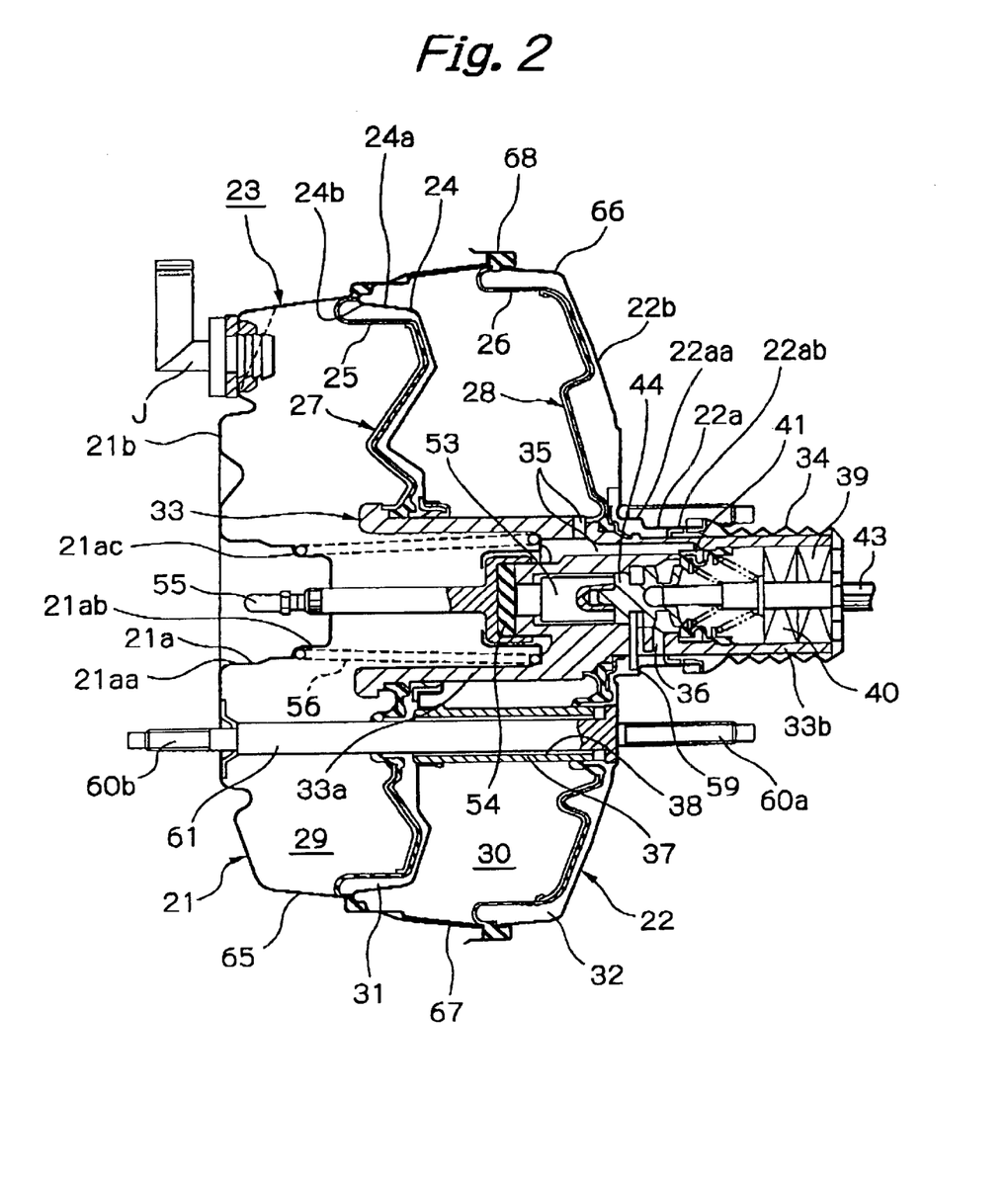
FIG. 2 is a sectional view showing the general structure of the tandem pneumatic booster according to the present invention.
Figure 3:
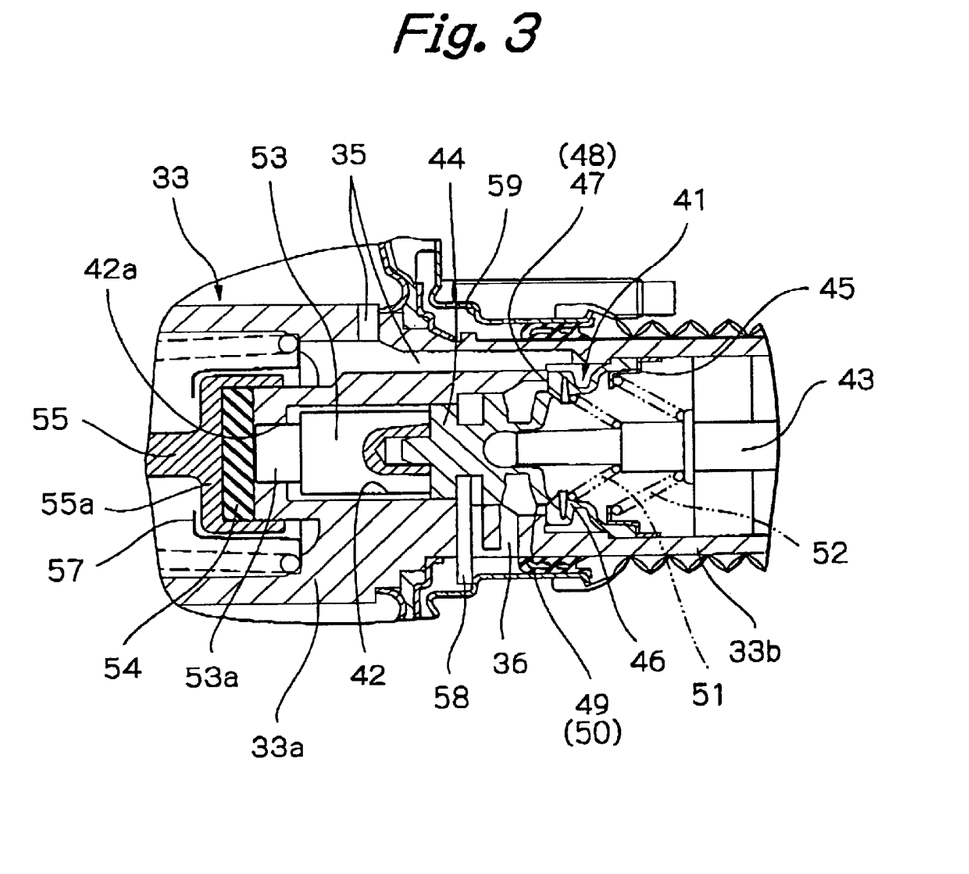
FIG. 3 is an enlarged sectional view showing a valve mechanism of the tandem pneumatic booster according to the present invention.

FIGS. 1 to 3 show a pneumatic booster as one embodiment of the present invention. The pneumatic booster is arranged in the form of a tandem pneumatic booster. The basic structure of the tandem pneumatic booster is similar to that shown in FIG. 6. That is, a shell body 23 comprises a front shell 21 (front shell element) and a rear shell 22 (rear shell element). The front shell 21 has a bottom portion 21b and a cylindrical portion 65 (outer cylindrical portion) extending rearward from the bottom portion 21b to a considerable extent. The rear shell 22 has a bottom portion 22b and a cylindrical portion 66 (outer cylindrical portion) extending a short distance forward from the bottom portion 22b. The interior of the shell body 23 is divided by a center shell 24 (center shell element) into two chambers, i.e., a front chamber and a rear chamber. The center shell 24 has a bottom portion 24b and a cylindrical portion 67 extending rearward from the outer periphery of the bottom portion 24b to a relatively considerable extent. The two chambers divided by the center shell 24 are further divided. That is, the front chamber is divided by a power piston 27 having a diaphragm 25 into a constant-pressure chamber 29 and a variable-pressure chamber 31. Similarly, the rear chamber is divided by a power piston 28 having a diaphragm 26 into a constant-pressure chamber 30 and a variable-pressure chamber 32. The power pistons 27 and 28 are provided with a mutual valve body 33. The valve body 33 extends air-tightly and slidably through a central portion of the center shell 24 and through a reduced-diameter cylindrical portion 22a (inner cylindrical portion) extending from the rear of the rear shell 22, that is, from the bottom portion 22b. It should be noted that a recess 21a (inner cylindrical portion) is provided in the center of the front of the front shell 21, that is, in the center of the bottom portion 21b. The recess 21a is formed in the shape of a cylinder, one end of which is closed, projecting in the direction of extension of the cylindrical portion 65 to partially receive a master cylinder (not shown). A dust boot 34 is mounted on the reduced-diameter cylindrical portion 22a (inner cylindrical portion) of the rear shell 22 to cover a portion of the valve body 33 that projects from the shell body 23. Further, the bottom portion 24b of the center shell 24 is provided with a projecting portion 24a projecting with a wide area in the direction of extension of the cylindrical portion 67.

The valve body 33 has a cup-shaped body portion 33a and a hollow shaft portion 33b provided in series. The body portion 33a is provided with a negative-pressure passage 35 providing communication between the two constant-pressure chambers 29 and 30 and allowing each of the constant-pressure chambers 29 and 30 to communicate with the interior of the hollow shaft portion 33b. In addition, the body portion 33a is provided with a first atmospheric air passage 36 providing communication between the interior of the hollow shaft portion 33b and the rear variable-pressure chamber 32. Meanwhile, a communicating pipe 37 is disposed to extend between the rear shell 22 and the center shell 24. A second atmospheric air passage 38 is set in the communicating pipe 37 to provide communication between the rear variable-pressure chamber 32 and the front variable-pressure chamber 31. A negative pressure from an engine, for example, is introduced into the front constant-pressure chamber 29 through a pipe joint J provided on the front shell 21. The negative pressure is also supplied into the rear constant-pressure chamber 30 through the negative-pressure passage 35. Atmospheric air is introduced into the hollow shaft portion 33b of the valve body 33 through a silencer 39 and a filter 40. The atmospheric air introduced into the hollow shaft portion 33b is supplied to the front and rear variable-pressure chambers 31 and 32 through the first and second atmospheric air passages 36 and 38 by the operation of a valve mechanism 41 (described later).

As shown clearly in FIG. 3, the valve mechanism 41 includes a valve plunger 44 slidably fitted in an axial bore 42 provided in the body portion 33a of the valve body 33 and connected to an input rod 43 that moves in response to the actuation of a brake pedal (not shown). The valve mechanism 41 further includes a poppet valve 46 fixed at the proximal end thereof to the inner surface of the hollow shaft portion 33b of the valve body 33 by a retaining member 45. A vacuum valve 48 is formed between the outer peripheral edge at the distal end of the poppet valve 46 and an annular valve seat 47 formed on the inner peripheral surface of the valve body 33. An atmospheric air valve 50 is formed between the inner peripheral edge at the distal end of the poppet valve 46 and an annular valve seat 49 formed on the rear end of the valve plunger 44. In additions a valve spring 51 is retained at one end thereof on the input rod 43 to normally bias the vacuum valve 48 and the atmospheric air valve 50 in the valve-closing direction. A return spring 52 is interposed between the retaining member 45 and the input rod 43. The return spring 52 operates such that in an inoperative state where there is no input from the brake pedal, the valve plunger 44 maintains the condition that the annular valve seat 49 on the rear end thereof abuts against the poppet valve 46.

In addition, a stepped moving member 53 is accommodated in the axial bore 42 of the valve body 33. The moving member 53 is connected at the rear end thereof to the valve plunger 44 to move together with the plunger 44 as one unit. The moving member 53 has a distal end portion 53a with a reduced diameter. The distal end portion 53a is inserted in a reduced-diameter hole portion 42a of the axial bore 42. At the bottom of the cup-shaped body portion 33a of the valve body 33, a reaction disk 54 made of an elastic material, e.g., rubber, is disposed, together with an enlarged-diameter portion 55a at the proximal end of an output rod 55. In an inoperative state where there is no input from the brake pedal, the moving member 53 is positioned with a slight gap between the distal end thereof and the rear side of the reaction disk 54. The distal end of the output rod 55 air-tightly and slidably extends forward through the bottom of the recess 21a provided on the front of the front shell 21, that is, on the bottom portion 21b. The distal end of the output rod 55 is inserted into the master cylinder (not shown) fitted in the recess 21a.

Meanwhile, a return spring 56 is disposed in the front constant-pressure chamber 29 to return the valve body 33 to the original position. One end of the return spring 56 abuts against a rear portion of the recess 21a. The other end of the return spring 56 abuts against the bottom of the cup-shaped valve body 33 through a spring retainer 57. The return spring 56 normally biases the valve body 33 rearward. Further, the valve body 33 has a stopper key 58 inserted radially into a portion thereof near the boundary between the body portion 33a and the hollow shaft portion 33b. The original position of the valve body 33 is where the stopper key 58 abuts against a step portion 59 provided on the reduced-diameter cylindrical portion 22a of the rear shell 22. It should be noted that the spring retainer 57 is also used as a member for preventing dislodging of the reaction disk 54 and the enlarged-diameter portion 55a at the proximal end of the output rod 55. The stopper key 58 also serves as a means for limiting the movable range of the valve plunger 44 with respect to the valve body 33.

The pneumatic booster is mounted on a vehicle body (not shown) by using a plurality of stud bolts 60a provided on the rear side of the rear shell 22, while the master cylinder (not shown) is connected to the pneumatic booster by using stud bolts 60b provided on the front side of the front shell 21 (see FIG. 2). It should be noted that in this embodiment, the stud bolts 60a and 60b are integrally provided at both ends of a reinforcing rod 61 extending through the communicating pipe 37 for communication between the rear variable-pressure chamber 32 and the front variable-pressure chamber 31.

In this embodiment, the front shell 21 has a bottom portion 21b and a cylindrical portion 65 extending rearward from the outer periphery of the bottom portion 21b to a considerable extent, and the rear shell 22 has a bottom portion 22b and a cylindrical portion 66 extending forward a short distance from the bottom portion 22b. The opening edge (flange) 65a of the cylindrical portion 65 of the front shell 21 is joined to the opening edge (folded-back portion) 66a of the cylindrical portion 66 of the rear shell 22, and these edges are united together by caulking to form the shell body 23. The center shell 24 has a bottom portion 24b and a cylindrical portion 67 extending rearward from the bottom portion 24b to a relatively considerable extent. The center shell 24 is fixedly positioned in the shell body 23 in a state where the opening edge (flange) 67a of the cylindrical portion 67 is disposed in the joint 68 between the front shell 21 and the rear shell 22. Of the diaphragms 25 and 26 constituting the power pistons 27 and 28, the rear diaphragm 26 is supported by the shell body 23 with an outer peripheral bead 26a thereof disposed in the joint 68. The front diaphragm 25 is supported by the shell body 23 in a state where an outer peripheral bead 25a of the diaphragm 25 is disposed between a step portion 65b provided on an intermediate part of the cylindrical portion 65 of the front shell 21 and a shoulder portion 67b at the proximal end of the cylindrical portion 67 of the center shell 24.

Thus, the cylindrical portion 65 of the front shell 21, the cylindrical portion 66 of the rear shell 22 and the cylindrical portion 67 of the center shell 24 are each formed generally in a frusto-conical shape that gradually increases in diameter toward the opening edge thereof. In other words, the bottom portions 21*b*, 22*b* and 24*b* of the cylindrical portions 65, 66 and 67 have reduced diameters, and the opening edges 65*a*, 66*a* and 67*a* thereof have enlarged diameters. In addition, the cylindrical portion 65 of the front shell 21 is provided with a circular straight cylindrical portion 69 adjacent to the step portion 65*b*. Further, the cylindrical portion 67 of the center shell 24 is provided with a circular straight cylindrical portion 70 adjacent to the shoulder portion 67*b*.

The term "frusto-conical" used in this description is not limited to mean to have a conical portion of a circular cross section. The shape meant by this term may have any cross sectional configuration other than a circle, although circular frusto-conical shape is meant for the embodiments. The invention covers the use of any frustum shapes, such as a truncated pyramidal cone shape.

The recess 21*a* of the front shell 21 is increased In diameter at the side thereof closer to the bottom portion 21*b* to form an enlarged-diameter portion (proximal end edge) 21*aa*. The diameter of the recess 21*a* is reduced at the projecting end side thereof, which projects in the direction of extension of the cylindrical portion 65, to form a reduced-diameter portion 21*ab* smaller in diameter than the enlarged-diameter portion 21*aa*. A step portion 21*ac* is provided between the enlarged-diameter portion 21*aa* and the reduced-diameter portion 21*ab*. The reduced-diameter cylindrical portion 22*a* of the rear shell 22 is increased in diameter at the proximal end side thereof, that is, at the side closer to the bottom portion 22*b*, to form an enlarged-diameter portion (proximal end edge) 22*aa*. The reduced-diameter cylindrical portion 22*a* has a reduced-diameter portion 22*ab* at the distal end side thereof, which is smaller in diameter than the enlarged-diameter portion 22*aa*. The above-described step portion 59 is provided between the enlarged-diameter portion 22*aa* and the reduced-diameter portion 22*ab*. The projecting portion 24*a* of the center shell 24 is increased in diameter at the proximal end side thereof, that is, at the side thereof closer to the bottom portion 24*b*, and reduced In diameter at the distal end side thereof. The projecting portion 24*a* has a frusto-conical shape that gradually increases in diameter from the distal end side toward the proximal end side.

The operation of the pneumatic booster arranged as stated above will be described below.

The pneumatic booster is mounted on the vehicle body by using the stud bolts 60*a* (see FIG. 2). When the brake pedal is depressed, the input rod 43 advances, causing the valve plunger 44 to advance. Consequently, the atmospheric air valve 50 opens, and atmospheric air flows into the valve body 33 through the silencer 39 and the filter 40. The atmospheric air is introduced into the rear variable-pressure chamber 32 and the front variable-pressure chamber 31 through the first atmospheric air passage 36 and the second atmospheric air passage 38. As a result, differential pressures are produced between the constant-pressure chambers 29 and 30 supplied with a negative pressure and the variable-pressure chambers 31 and 32 supplied with atmospheric air. The differential pressures propel the power pistons 27 and 28. Thus, an output boosted with a predetermined ratio is transmitted from the valve body 33 to the master cylinder through the output rod 55. In this way, a predetermined boosting action is started.

At the time of starting the boosting action, the output increases independently of the input until the reduced-diameter portion 53*a* at the distal end of the moving member 53 connected to the valve plunger 44 abuts against the reaction disk 54, i.e., until the gap therebetween is canceled. That is, "jump-in" occurs. After the "jump-in", an output reaction force is transmitted successively to the moving member 53, the valve plunger 44 and the input rod 43 from the output rod 55 through the reaction disk 54. Thus, a boosting action in which the output increases according to the increase in the input takes place. When the brake pedal is released, the input rod 43 is retracted by the restoring force of the return spring 52, and the valve plunger 44 also retracts. Consequently, the atmospheric air valve 50 is closed, whereas the vacuum valve 48 opens to introduce a negative pressure into the variable-pressure chambers 31 and 32 through the negative-pressure passage 35 and the first and second first atmospheric air passages 36 and 38. Thus, the above-described differential pressures are canceled. Thereafter, the valve body 33 is retracted by the spring force of the return spring 56, causing the power pistons 27 and 28 to return to the respective original positions.

Incidentally, the shell elements, i.e., the front shell 21, the rear shell 22 and the center shell 24, are each integrally formed from a plate material by a press. As constituent parts before assembly, the shell elements are stored and transported in the form of stacks of predetermined numbers of front shells 21, rear shells 22 and center shells 24, respectively.

Figure 4A:
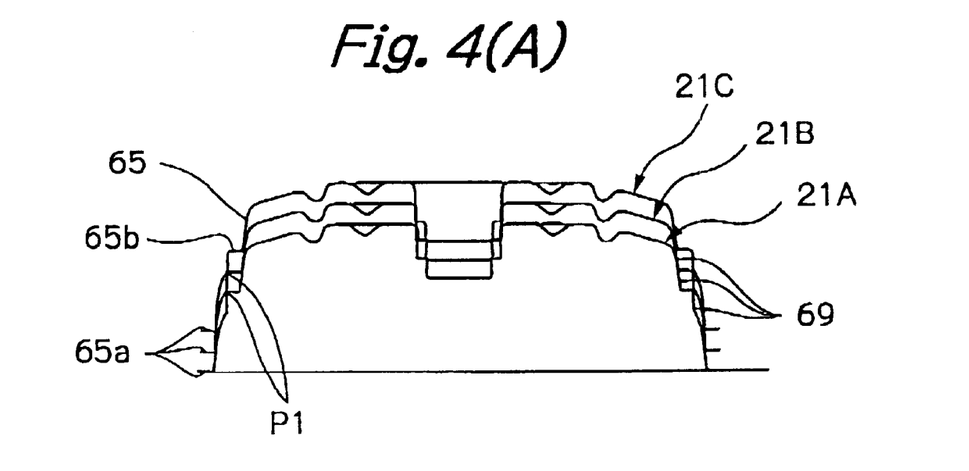
FIGS. 4(A), 4(B) and 4(C) are sectional views showing the stacked conditions of shell elements constituting the tandem pneumatic booster according to the present invention.
Figure 4B:
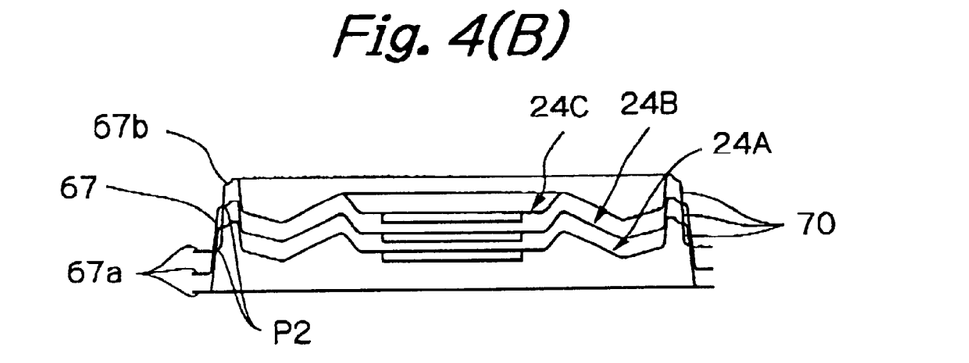
Figure 4C:
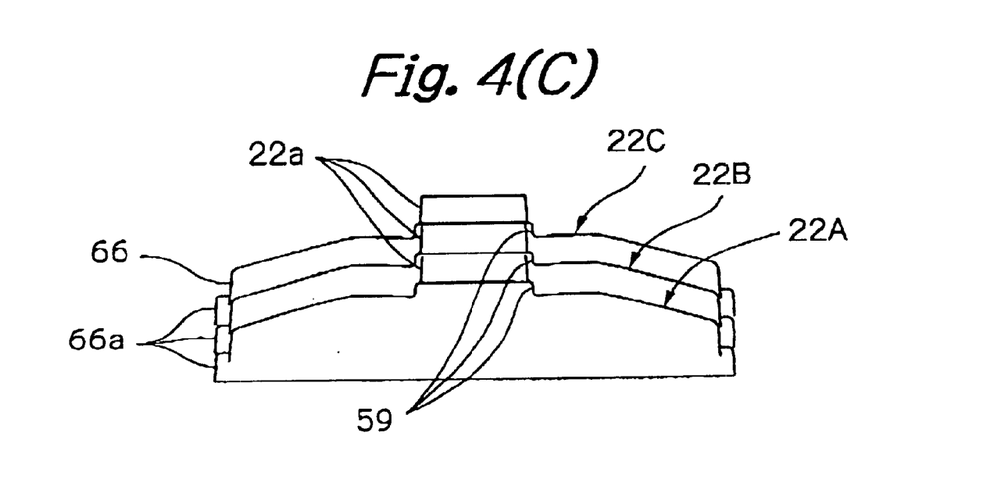

FIGS. 4(A), 4(B) and 4(C) show the stacked conditions of the front shells 21, the center shells 24 and the rear shells 22. Regarding the front shells 21 (21A, 21B and 21C) and the center shells 24 (24A, 24B and 24C), the cylindrical portions 65 and 67 each have a frusto-conical shape diverging toward the opening edge thereof. In addition, the recess 21*a* of the front shell 21 has the enlarged-diameter portion 21*aa* at the proximal end and the reduced-diameter portion 21*ab* at the distal end, and the projecting portion 24*a* of the center shell 24 has a frusto-conical shape. Therefore, when stacked on one another, the shell elements are fitted deeply into one another. In other words, when a plurality of front shells 21 are stacked on one another, the cylindrical portions 65 of each pair of adjacent front shells 21 are fitted in each other, and so are the recesses 21*a*. Thus, a large overlap occurs between each pair of adjacent shell elements. As a result, there is no likelihood that the stack of shell elements may lose balance and collapse.

Moreover, the cylindrical portion 65 of each front shell 21 and the cylindrical portion 67 of each center shell 24 have considerable lengths, respectively. Therefore, when stacked on one another, the front shells 21 are fitted deeply into one another, and so are the center shells 24. Accordingly, the stacks of front shells 21 and center shells 24 are markedly reduced in volume in comparison to the stacks of front shells 1 and center shells 4 in the prior art [see FIG. 7(A) and 7(B)]. Thus, the storage efficiency and the transport efficiency are improved correspondingly. Incidentally, when the present invention and the prior art are compared to each other in terms of stacks of the same number (e.g., three) of shell elements of the same size, the volumes of the stacks of front shells 21 and center shells 24 in the present invention are about 51% and 43%, respectively, of those of the conventional front shells 1 and center shells 4. Thus, the rate of reduction in volume is remarkably high. The volume reduction rate increases as the number of shell elements stacked on one another increases.

Each front shell 21 and each center shell 24 are fitted in the underlying front shell 21 and center shell 24, respectively, until the circular straight cylindrical portions 69 and 70 are engaged with those of the underlying front shell 21 and center shell 24, respectively. Points P1 and P2 in FIGS. 4(A) and 4(B) show the engagement points (stopper portions). Thus, the depth of fitting between each pair of adjacent front shells 21 is regulated before their cylindrical portions 65 stick fast to each other. Similarly, the depth of fitting between each pair of adjacent center shells 24 is regulated before their cylindrical portions 67 stick fast to each other. As a result, there is no likelihood that the stacked shell elements will become difficult to separate from each other owing to the wedge effect. Thus, an assembling operation carried out afterward is facilitated.

Figure 5:
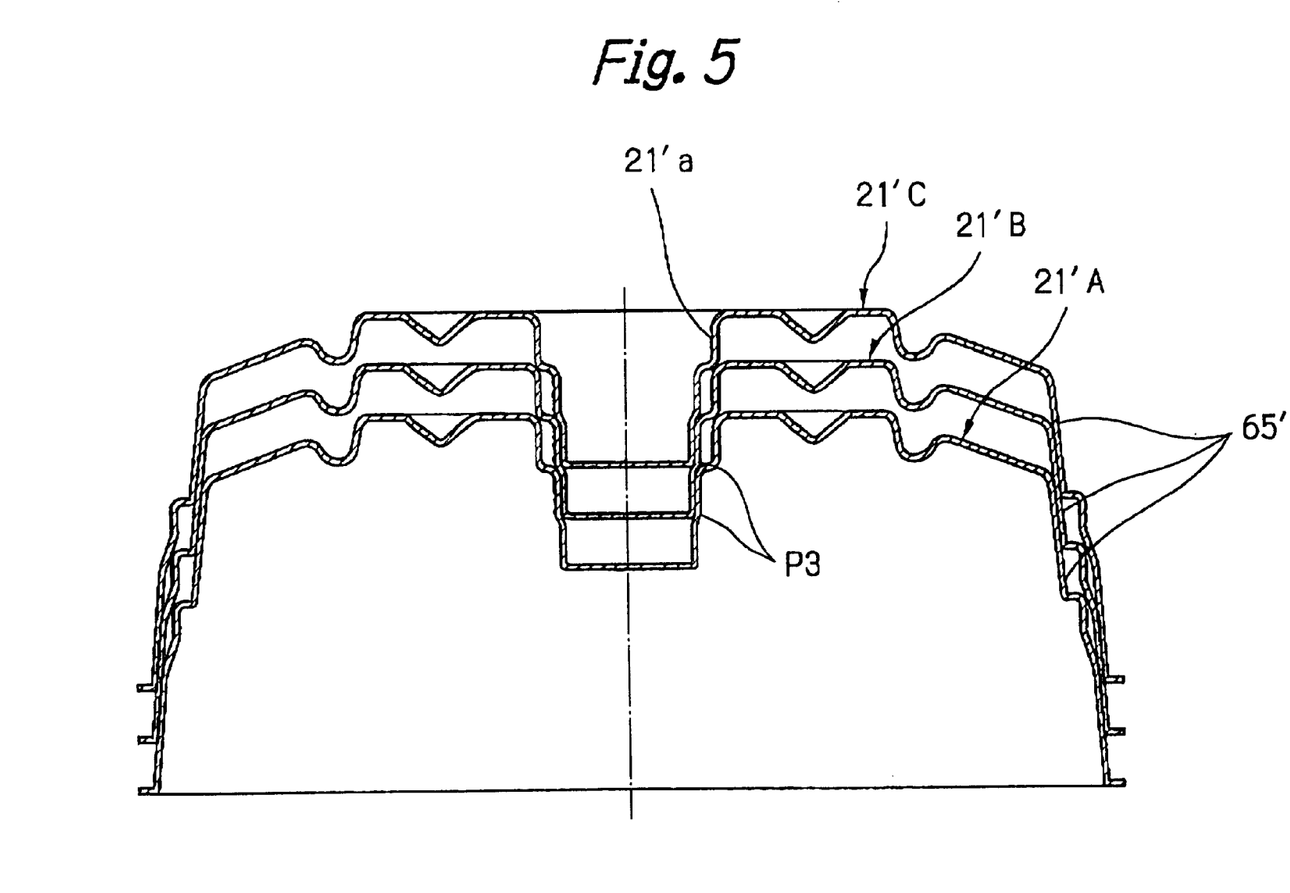
FIG. 5 is a sectional view showing another embodiment of a shell element constituting the tandem pneumatic booster according to the present invention.

Although the engagement points are provided on the outer peripheral sides of the shell elements in the foregoing embodiment, it should be noted that positions where engagement points are provided are not necessarily limited thereto. As shown In FIG. 5 by way of example, engagement points P3 may be provided within the recesses 21' a of the front shells 21' (21' A, 21' B and 21'C). In this case, there is no possibility of damaging the outer peripheral surface of the cylindrical portion 65' of each front shell 21' or the inner peripheral surface thereof that is to be contacted by the diaphragms 25 and 26. Accordingly, the quality of the pneumatic booster can be maintained favorably.

Regarding the rear shells 22 (22A, 22B and 22C), as shown in FIG. 4(C), the length of the cylindrical portions 66 is short. Therefore, the overlap between the cylindrical portions 66 is not so large. However, the required overlap surely exists. Therefore, there is no likelihood that the stack of rear shells 22 may lose balance and collapse. Further, the reduced-diameter portion 22ab of the reduced-diameter cylindrical portion 22a of each rear shell 22 is inserted and fitted into the enlarged-diameter portion 22aa of the reduced-diameter cylindrical portion 22a of the rear shell 22 stacked thereon. Therefore, when stacked on one another, the rear shells 22 can be fitted into one another even more deeply and stably. In addition, each rear shell 22 has a step portion 59 provided on the reduced-diameter cylindrical portion 22a at the rear thereof so that the stopper key 58 abuts against the step portion 59, as has been stated above. Therefore, the rear shells 22 can be stacked on one another in a state where the distal end of the reduced-diameter cylindrical portion 22a of each rear shell 22 abuts against the step portion 59 of the rear shell 22 stacked thereon. Accordingly, the height of the stack of rear shells 22 is slightly lower than in the case of the conventional rear shells 2 [see FIG. 7(C)]. Moreover, the step portions 59 function as stopper portions to prevent the cylindrical portions 66 from sticking fast to each other. Therefore, it is easy to separate the stacked rear shells 22 from each other.

It should be noted that in the foregoing embodiment the cylindrical portion 65 of the front shell 21 has a frusto-conical shape, and the recess 21a has the step portion 21ac. However, the present invention is not necessarily limited thereto. The cylindrical portion 65 may be provided with a step portion, and the recess 21a may be formed in a frusto-conical shape.

Further, in the foregoing embodiment, the cylindrical portion 66 of the rear shell 22 has a frusto-conical shape, and the reduced-diameter cylindrical portion 22a has the step portion 59. However, the present invention is not necessarily limited thereto. The cylindrical portion 66 may be provided with a step portion, and the reduced-diameter cylindrical portion 22a may be formed in a frusto-conical shape.

Further, in the foregoing embodiment, both the cylindrical portion 67 and the projecting portion 24a of the center shell 24 have frusto-conical shapes. However, the present Invention is not necessarily limited thereto. Either or both of them may be provided with step portions.

Further, in the foregoing embodiment, the present invention has been described as a tandem pneumatic booster having the front shell 21, the rear shell 22 and the center shell 24. However, the present invention is not necessarily limited thereto. The present invention is also applicable to a single type pneumatic booster having no center shell, by way of example.

As has been stated above, the pneumatic booster according to the present invention provides the following advantages.

When shell elements, i.e. front shell elements, rear shell elements, and center shell elements, are stacked on one another, respectively, the cylindrical portions thereof overlap each other. Consequently, the stacks of shell elements are prevented from collapsing and, hence are easy to handle. Regarding the front shell and the center shell, which have relatively long cylindrical portions, each pair of adjacent shell elements as stacked are fitted into one another to a sufficient depth. Therefore, the volume of the stack is reduced to a considerable extent. Accordingly, the storage efficiency and the transport efficiency are markedly improved.

When a shell element whose cylindrical portion has a frusto-conical shape is provided with a stopper portion for regulating the depth of fitting between shell elements as stacked on one another when they are constituent parts before assembly, the cylindrical portions of the stacked shell elements are prevented from sticking fast to each other. Therefore, it becomes easy to separate the stacked shell elements from each other.

It should be noted that the present invention is not necessarily limited to the foregoing embodiments but can be modified In a variety of ways without departing from the gist of the present invention.

What is claimed is:

1. A pneumatic booster comprising:
   a front shell element having a bottom portion and an outer cylindrical portion extending from an outer edge of said bottom portion, said front shell element further having an inner cylindrical portion projecting from said bottom portion in a same direction as a direction of extension of said outer cylindrical portion to receive a master cylinder;
   a rear shell element engaged with said outer cylindrical portion of said front shell element to close an opening edge of said outer cylindrical portion to form a shell body;
   a valve body provided to extend through said rear shell element, said valve body having a valve mechanism therein; and
   at least one power piston engaged with said valve body to divide an interior of said shell body into a plurality of chambers,
   wherein said outer cylindrical portion of said front shell element has at least one reduced-diameter portion smaller in diameter than said opening edge, and said inner cylindrical portion of said front shell element has at least one reduced-diameter portion smaller in diameter than a proximal end edge of said inner cylindrical portion at said bottom portion, so that when a plurality of front shell elements as constituent parts before assembly are stacked on one another, both the outer cylindrical portions and the inner cylindrical portions of adjacent front shell elements are fitted in each other, respectively,
   wherein at least one of said outer cylindrical portion and said inner cylindrical portion of said front shell element has a frusto-conical shape gradually increasing in diameter from said reduced-diameter portion, and wherein said reduced-diameter portion of at lease one of said outer cylindrical portion and said inner cylindrical portion of said front shell element forms a stopper portion having a step, said stopper portion abutting on a corresponding cylindrical portion of an adjacent front shell element so that said stopper portion regulates a depth of fitting between each pair of adjacent front shell elements when the plurality of front shell elements as constituent parts before assembly are stacked on one another.

2. A pneumatic booster according to claim 1, wherein said rear shell element has a bottom portion and an outer cylindrical portion extending from an outer edge of said bottom portion and further has an inner cylindrical portion projecting from said bottom portion in a direction opposite to a direction of extension of said outer cylindrical portion, wherein said outer cylindrical portion of said rear shell element has a reduced-diameter portion smaller in diameter than an opening edge thereof, and said inner cylindrical portion of said rear shell element has at least one reduced-diameter portion smaller than a proximal edge of said inner cylindrical portion at said bottom portion, so that when a plurality of rear shell elements as constituent parts before assembly are stacked on one another, both the outer cylindrical portions and the inner cylindrical portions of adjacent rear shell elements are fitted in each other, respectively.

3. A pneumatic booster according to claim 2, wherein at least one of said outer cylindrical portion and said inner cylindrical portion of said rear shell element has a frusto-conical shape gradually increasing in diameter from said reduced-diameter portion.

4. A pneumatic booster according to claim 3, wherein said reduced-diameter portion of at least one of said outer cylindrical portion and said inner cylindrical portion of said rear shell element forms a stopper portion having a step, said stopper portion abutting on a corresponding cylindrical portion of an adjacent rear shell element so that said stopper portion regulates a depth of fitting between each pair of adjacent rear shell elements when the plurality of rear shell elements as constituent parts before assembly are stacked on one another.

5. A pneumatic booster comprising:
a front shell element to which a master cylinder is to be mounted;
a rear shell element having a bottom portion and an outer cylindrical portion extending from an outer edge of said bottom portion, said rear shell element further having an inner cylindrical portion projecting from said bottom portion in a direction opposite to a direction of extension of said outer cylindrical portion, wherein said front shell element and said rear shell element form a shell body;
a valve body provided to extend through said inner cylindrical portion of said rear shell element, said valve body having a valve mechanism therein; and
at least one power piston engaged with said valve body to divide an interior of said shell body into a plurality of chambers,
wherein said outer cylindrical portion of said rear shell element has at least one reduced-diameter portion smaller in diameter than an opening edge of said outer cylindrical portion, and said inner cylindrical portion of said rear shell element has at least one reduced-diameter portion smaller in diameter than a proximal end edge of said inner cylindrical portion at said bottom portion, so that when a plurality of rear shell elements as constituent parts before assembly are stacked on one another, both the outer cylindrical portions and the inner cylindrical portions of adjacent rear shell elements are fitted in each other, respectively, wherein at least one of said outer cylindrical portion and said inner cylindrical portion of said rear shell element has a frusto-conical shape gradually increasing in diameter from said reduced-diameter portion, and wherein said reduced-diameter portion of at least one of said outer cylindrical portion and said inner cylindrical portion of said rear shell element forms a stopper portion having a step, said stopper portion abutting on a corresponding cylindrical portion of an adjacent rear shell element so that said stopper portion regulates a depth of fitting between each pair of adjacent rear shell elements when the plurality of rear shell elements as constituent parts before assembly are stacked on one another.

6. A method of storing a plurality of front shell elements, each of the plurality of front shell elements having a bottom portion and an outer cylindrical portion extending from an outer edge of the bottom portion, each of the front shell elements further having an inner cylindrical portion projecting from the bottom portion in a same direction as a direction of extension of the outer cylindrical portion to receive a master cylinder, wherein the outer cylindrical portion of each of the front shell elements has at least one reduced-diameter portion smaller in diameter than the opening edge, and the inner cylindrical portion of each of the front shell elements has at least one reduced-diameter portion smaller in diameter than a proximal end edge of the inner cylindrical portion at the bottom portion, so that when the plurality of front shell elements as constituent parts before assembly are stacked on one another, both the outer cylindrical portions and the inner cylindrical portions of adjacent front shell elements are fitted in each other, respectively, wherein at least one of the outer cylindrical portion and the inner cylindrical portion of each of the front shell elements has a frusto-conical shape gradually increasing in diameter from the reduced-diameter portion, and wherein the reduced-diameter portion of at lease one of the outer cylindrical portion and the inner cylindrical portion of each of the front shell elements forms a stopper portion having a step, the stopper portion abutting on a corresponding cylindrical portion of an adjacent front shell element so that the stopper portion regulates a depth of fitting between each pair of adjacent front shell elements when the plurality of front shell elements as constituent parts before assembly are stacked on one another, in a form of a stack, said method comprising stacking the plurality of front shell elements on one another in such a manner that both the outer cylindrical portions and the inner cylindrical portions of adjacent front shell elements are fitted in each other, respectively.

7. A method of storing a plurality of rear shell elements each of the plurality of rear shell elements having a bottom portion and an outer cylindrical portion extending from an outer edge of the bottom portion, each of the rear shell elements further having an inner cylindrical portion projecting from the bottom portion in a direction opposite to a direction of extension of the outer cylindrical portion, wherein the outer cylindrical portion of each of the rear shell elements has at least one reduced-diameter portion smaller in diameter than an opening edge of the outer cylindrical portion, and the inner cylindrical portion of each of the rear shell elements has at least one reduced-diameter portion smaller in diameter than a proximal end edge of the inner cylindrical portion at the bottom portion, so that when the plurality of rear shell elements as constituent parts before assembly are stacked on one another, both the outer cylindrical portions and the inner cylindrical portions of adjacent rear shell elements are fitted in each other, respectively, wherein at least one of the outer cylindrical portion and the inner cylindrical portion of each of the rear shell elements has a frusto-conical shape gradually increasing in diameter from the reduced-diameter portion, and wherein the reduced-diameter portion of at least one of the outer cylindrical portion and the inner cylindrical portion of each of the rear shell elements forms a stopper portion having a step, the stopper portion abutting on a corresponding cylindrical portion of an adjacent rear shell element so that the stopper portion regulates a depth of fitting between each pair of adjacent rear shell elements when the plurality of rear shell elements as constituent parts before assembly are stacked on one another in a form of a stack, said method comprising stacking the plurality of rear shell elements on one another in such a manner that both the outer cylindrical portions and the inner cylindrical portions of adjacent rear shell elements are fitted in each outer, respectively.

8. A pneumatic booster comprising:

a front shell element having a bottom portion and an outer cylindrical portion extending from an outer edge of said bottom portion, a rear shell element engaged with said outer cylindrical portion of said front shell element to close an opening edge of said outer cylindrical portion to form a shell body;

a valve body provided to extend through said rear shell element, said valve body having a valve mechanism therein; and at least one power piston engaged with said valve body to divide an interior of said shell body into a plurality of chambers, wherein said outer cylindrical portion of said front shell element has at least one reduced-diameter portion smaller in diameter than said opening edge, so that when a plurality of front shell elements as constituent parts before assembly are stacked on one another, the outer cylindrical portions of adjacent front shell elements are fitted in each other, wherein said outer cylindrical portion of said front shell element has a frusto-conical shape gradually increasing in diameter from said reduced-diameter portion, and wherein said reduced-diameter portion of said outer cylindrical portion of said front shell element forms a stopper portion having a step, said stopper portion abutting on a corresponding cylindrical portion of an adjacent front shell element so that said stopper portion regulates a depth of fitting between each pair of adjacent front shell elements when the plurality of front shell elements as constituent parts before assembly are stacked on one another.

* * * * *